(12) United States Patent
Young et al.

(10) Patent No.: US 11,274,239 B2
(45) Date of Patent: Mar. 15, 2022

(54) HIGH PERFORMANCE WATER BASED FLUID

(71) Applicant: M-I L.L.C., Houston, TX (US)

(72) Inventors: Steven Philip Young, Cypress, TX (US); Emanuel Stamatakis, Houston, TX (US); Meghan Ruth Riley, Houston, TX (US); Yiyan Chen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 319 days.

(21) Appl. No.: 15/500,889

(22) PCT Filed: Jul. 31, 2015

(86) PCT No.: PCT/US2015/043184
§ 371 (c)(1),
(2) Date: Jan. 31, 2017

(87) PCT Pub. No.: WO2016/019281
PCT Pub. Date: Feb. 4, 2016

(65) Prior Publication Data
US 2019/0071595 A1 Mar. 7, 2019

Related U.S. Application Data

(60) Provisional application No. 62/031,578, filed on Jul. 31, 2014.

(51) Int. Cl.
*C09K 8/08* (2006.01)
*C09K 8/04* (2006.01)

(52) U.S. Cl.
CPC ............... *C09K 8/08* (2013.01); *C09K 8/04* (2013.01); *C09K 2208/10* (2013.01); *C09K 2208/12* (2013.01)

(58) Field of Classification Search
CPC .... C09K 8/035; C09K 2208/26; C09K 8/512; C09K 8/12; C09K 8/5083; C09K 8/52; C09K 8/42; C09K 8/467; C09K 8/5086; C09K 8/516; C09K 8/72; C09K 8/885; C09K 8/92; C09K 2208/18; C09K 2208/24; C09K 8/08; C09K 8/5045; C09K 8/514; C09K 2208/12; C09K 8/22; C09K 2208/08; C09K 8/10; C09K 8/206; C09K 8/24; C09K 8/40; C09K 8/588; C09K 8/62; C09K 8/665; C09K 8/68; C09K 8/90

See application file for complete search history.

(56) References Cited

U.S. PATENT DOCUMENTS

| | | | |
|---|---|---|---|
| 6,247,543 B1 | 6/2001 | Patel et al. | |
| 6,484,821 B1 * | 11/2002 | Patel | C09K 8/206 175/64 |
| 7,915,202 B2 | 3/2011 | Smith et al. | |
| 2003/0106718 A1 * | 6/2003 | Patel | C09K 8/06 175/64 |
| 2006/0111521 A1 * | 5/2006 | Berry | C08J 3/02 525/474 |
| 2008/0039345 A1 | 2/2008 | Kipple et al. | |
| 2009/0247429 A1 | 10/2009 | Miller | |
| 2010/0210484 A1 * | 8/2010 | Smith | C09K 8/035 507/222 |
| 2011/0056752 A1 * | 3/2011 | Young | C09K 8/08 175/57 |
| 2011/0092396 A1 | 4/2011 | Cliffe | |
| 2011/0306524 A1 * | 12/2011 | Smith | C09K 8/035 507/136 |
| 2013/0281326 A1 | 10/2013 | Merli et al. | |

FOREIGN PATENT DOCUMENTS

| | | | |
|---|---|---|---|
| CN | 103773353 | * | 5/2013 |
| WO | WO9603474 | * | 2/1996 |
| WO | WO2013/162902 | * | 10/2013 |

OTHER PUBLICATIONS

Jeffamine D-230 product dat sheet downloaded on May 14, 2019.*
International Preliminary Report on Patentability for the equivalent International patent application PCT/US2015/043184 dated Feb. 9, 2017.

* cited by examiner

*Primary Examiner* — Kumar R Bhushan

(57) ABSTRACT

A fluid may include an aqueous based continuous phase, a pH adjusting additive, wherein the pH adjusting additive is formic acid, and a clay hydration suppressant agent having the formula $H_2NCH(CH_3)CH_2(OCH(CH_3)CH_2)_xNH_2$, wherein x is a value less than 15.

17 Claims, 4 Drawing Sheets

HIGH PERFORMANCE WATER BASED FLUID

CROSS-REFERENCE TO RELATED APPLICATIONS

The present claims priority to U.S. Patent Application No. 62/031,578 filed on Jul. 31, 2014, which is herein incorporated by reference.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

The selection of the type of wellbore fluid to be used in a drilling application involves a careful balance of both the good and bad characteristics of the wellbore fluids in the particular application and the type of well to be drilled. However, historically, aqueous based wellbore fluids have been used to drill a majority of wells. Their lower cost and better environment acceptance as compared to oil based wellbore fluids continue to make them the first option in drilling operations. Frequently, the selection of a fluid may depend on the type of formation through which the well is being drilled.

The types of subterranean formations intersected by a well, include sandstone, limestone, shale, siltstone, etc., many of which may be at least partly composed of clays, including shales, mudstones, siltstones, and claystones. Shale is the most common, and certainly the most troublesome, rock type that is drilled in order to reach oil and gas deposits. The characteristic that makes shales most troublesome to drillers is its water sensitivity, due in part to its clay content and the ionic composition of the clay.

In penetrating through such formations, many problems may be encountered including bit balling, swelling or sloughing of the wellbore, stuck pipe, and dispersion of drill cuttings. This may be particularly true when drilling with a water-based fluid due to the high reactivity of clay in an aqueous environment. When dry, the clay has too little water to stick together, and it is thus a friable and brittle solid. Conversely, in a wet zone, the material is liquid-like with very little inherent strength and can be washed away. However, intermediate to these zones, the shale is a sticky plastic solid with greatly increased agglomeration properties and inherent strength.

When drilling a subterranean well, as the drill bit teeth penetrate the formation, drill chips are generated by the action of the bit. When these cuttings are exposed to conventional water-based muds, they imbibe water and are rapidly dispersed. However recent advances in wellbore fluid technology have developed highly inhibitive muds which appear to reduce the hydration of shale and in doing so produce sticky, plastic shale fragments. These fragments adhere to each other and to the bottomhole assembly and cutting surfaces of the drill bit, gradually forming a large compacted mass of clay on the drilling equipment. This process, or phenomenon, of accumulation and impacting is generally referred to as "balling" or "packing off" of the drilling equipment.

Clay swelling during the drilling of a subterranean well can have a tremendous adverse impact on drilling operations. Bit balling reduces the efficiency of the drilling process because the drill string eventually becomes locked. This causes the drilling equipment to skid on the bottom of the hole preventing it from penetrating uncut rock, therefore slowing the rate of penetration. Furthermore, the overall increase in bulk volume accompanying clay swelling impacts the stability of the borehole, and impedes removal of cuttings from beneath the drill bit, increases friction between the drill bit and the sides of the borehole, and inhibits formation of the thin filter cake that seals formations. Clay swelling can also create other drilling problems such as loss of circulation or stuck pipe and increased viscosity of the wellbore fluid that slow drilling and increase drilling costs. The downtime associated with either soaking the bit or tripping the bit can be very costly and is therefore undesirable.

Thus, given the frequency in which shale is encountered in drilling subterranean wells, there exists a continuing need for methods of drilling using aqueous based wellbore fluids that will reduce potential problems encountered when drilling through shales such as with dispersion of shales, cuttings accretion and agglomeration, cuttings build up, bit balling, and hole cleaning.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fluid, that includes an aqueous based continuous phase, a pH adjusting additive, wherein the pH adjusting additive is formic acid and a clay hydration suppressant agent having the formula

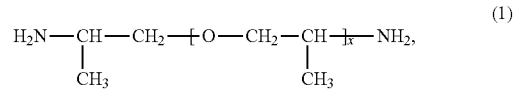

wherein x is a value less than 15.

In another aspect, embodiments of the present disclosure relate to a method that includes pumping a water-based drilling fluid into a wellbore through an earthen formation, the drilling fluid including an aqueous based continuous phase, a pH adjusting additive, wherein the pH adjusting additive is formic acid and a clay hydration suppressant agent, having the formula

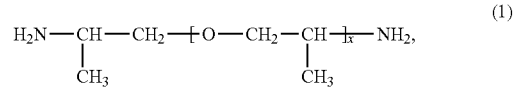

wherein x is a value less than 15.

In yet another aspect, embodiments of the present disclosure relate to a fluid, that includes an aqueous based continuous phase, a pH adjusting additive, wherein the pH adjusting additive is formic acid, a clay hydration suppressant agent having the formula

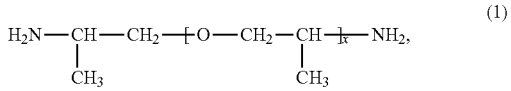

(1)

wherein x is a value less than 15, an encapsulator, and a plurality of dry particles of a latex-starch copolymer.

Other aspects and advantages of the claimed subject matter will be apparent from the following description and the appended claims.

BRIEF DESCRIPTION OF DRAWINGS

Embodiments of the present disclosure are described with reference to the following figures. The same numbers are used throughout the figures to reference like features and components.

DETAILED DESCRIPTION

Figure 1:
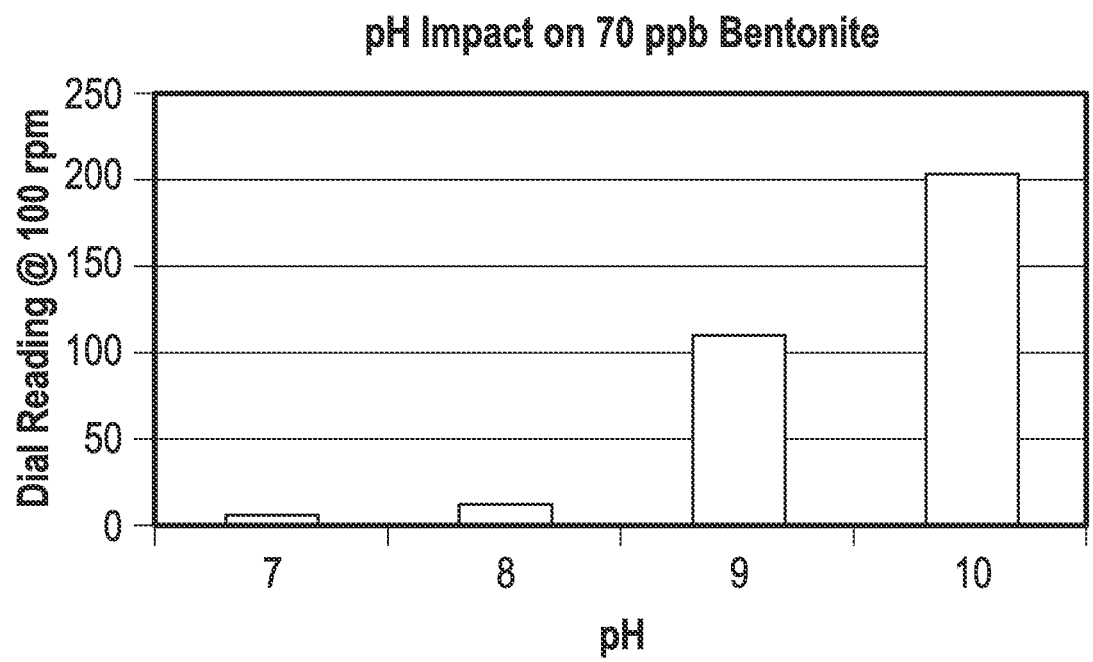
FIG. 1 is a graphical representation of the dial reading viscosity comparison of formulations having different acids.

Embodiments disclosed herein relate generally to high performance water based drilling fluids for use in drilling wells through a formation containing a shale which swells in the presence of water. More specifically, embodiments disclosed herein relate to drilling fluids for downhole applications formed of an aqueous based continuous phase, a clay hydration suppressant agent and a pH adjusting additive, wherein the pH adjusting additive is formic acid. The inventors of the present disclosure have found that the combination of the clay hydration suppressant agent and formic acid may result in drilling fluids that exhibit high solids tolerance and improved inhibition over a range of base fluids, as well as improved cuttings hardness. In addition, the presence of a dry pore sealant having a multimodal distribution and a specific peak distribution allows the sealant particles which are small enough to penetrate narrow voids, efficiently sealing the shales and the filter cakes. Furthermore, a carefully selected partially ionic polymer with proper balancing of charge species, charge density and molecular weight may be employed to prevent cuttings from dispersing into the drilling fluid.

As disclosed below, the water-based drilling fluids of the present disclosure may also include additional components, such as weighting agents, fluid loss control agents, bridging agents, lubricants, anti-bit balling agents, corrosion inhibition agents, surfactants and suspending agents and the like which may be added to an aqueous based drilling fluid.

One of the components of the drilling fluids of the present disclosure is a clay hydration suppressant agent which is a polyoxyalkyleneamine which inhibits the swelling of shale that may be encountered during the drilling process. The alkylene group is a propylene, thus the clay hydration suppressant of the present disclosure may be selected from the general group of polyoxypropyleneamines. While a variety of members of this group may serve as clay hydration suppressants, the inventors of the present disclosure have found that compounds having the general formula

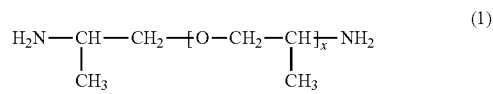

(1)

provide effective inhibition of shale hydration.

The value of x has been found to be a factor in the ability of the shale hydration inhibitors to carry out their desired role. The value of x may be a whole number or fractional number that reflects the average molecular weight of the compound. In one embodiment of the present disclosure x may have a value less than 15. In yet another embodiment x may have a value between about 1 and about 5.

In another embodiment of the present disclosure, the value of x is determined by the molecular weight of the shale hydration inhibition agent. Thus, x is selected such that the average molecular weight of the hydration inhibition agent is from about 132 to about 944. In another embodiment, x is selected such that the average molecular weight of the hydration inhibition agent is from about 190 to about 248. However, regardless of how a particular value of x is selected, the shale hydration inhibition agent should function as intended in the drilling fluid and should minimize any impact it might have on the other properties of the drilling fluid.

The clay hydration suppressant should be present in sufficient concentration to reduce either or both the surface hydration based swelling and/or the osmotic based swelling of the shale. The amount of the clay hydration suppressant present in a particular drilling fluid formulation can be determined by a trial and error method of testing the combination of drilling fluid and shale formation encountered. Generally however, the clay hydration suppressant of the present disclosure may be used in drilling fluids in a concentration from about 1 to about 18 pounds per barrel (lbs/bbl or ppb). In one or more particular embodiments, the clay hydration suppressant is used in a concentration from about 2% by volume to about 4% by volume of the fluid.

In addition to the inhibition of shale hydration by the clay hydration suppressant, other properties are beneficially achieved. It has been found that the clay hydration suppressants of the present disclosure may also be further characterized by their compatibility with other drilling fluid components, tolerant to contaminants, temperature stability and low toxicity. These factors contribute to the concept that the clay hydration suppressants of the present disclosure may have broad application both in land based drilling operations, as well as offshore drilling operations.

The drilling fluid of the present disclosure incorporates formic acid as a pH adjusting additive. Other organic acids which may be used include for example acetic acid. Mineral acids such as hydrochloric acid may be used as well, although similar experimental data are obtained in the case of using formic acid, as shown in FIG. 1 and Table 1. Furthermore, as shown in FIG. 1 and described later, it was found that by using formic acid as a pH adjusting additive, the pH can be lower to a desired value deemed non-corrosive, without affecting the viscosity of the package, thus improving the well-site handling of the package. In addition, formic acid also offers the advantage of being less expensive than other organic acids such as benzoic acid.

Figure 2:
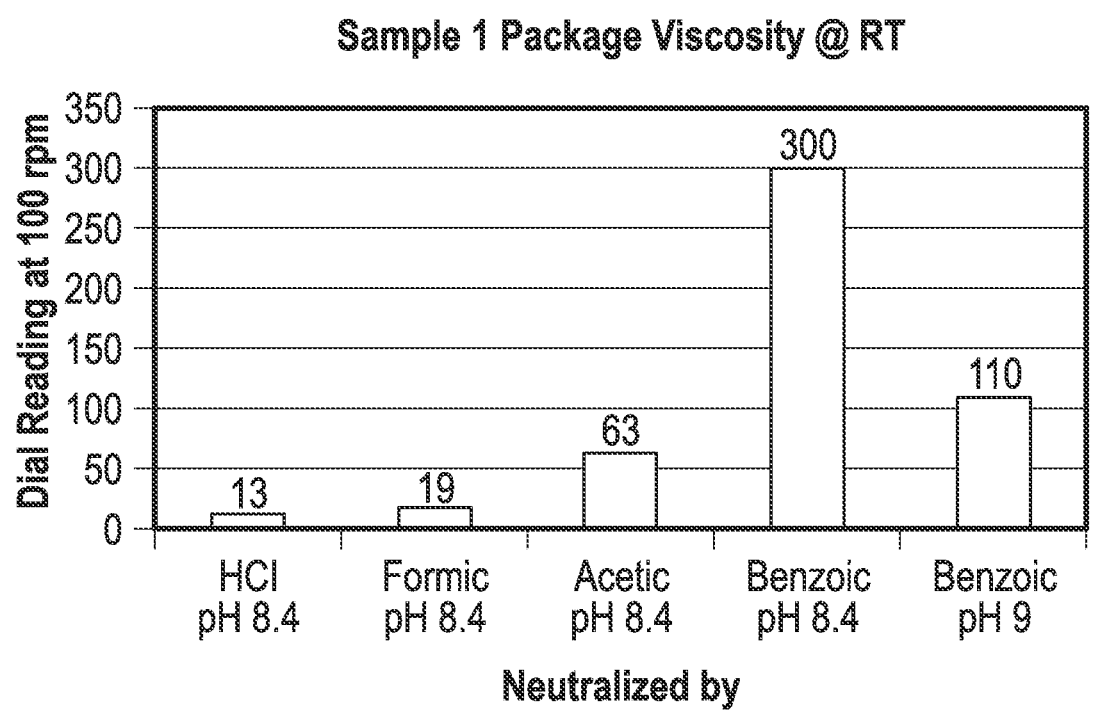
FIG. 2 is a graphical representation of the pH impact on the viscosity of a 70 ppb (lb/bbl) bentonite dispersed fluid.

In one or more embodiments, formic acid may be used in such an amount to acidify at least a portion of the drilling fluid to a pH of less than 9, or at least less than 8.5, or less than 8. In yet another embodiment, formic acid is used in such amount that the pH of at least a portion of the drilling fluid is from about 8 to about 8.5. As shown in FIG. 2 and described later, such values are selected based on experimental results of bentonite dispersion tests where the bentonite water dispersion is maintained at a desired low viscosity when the pH is equal or lower than 9.

The inventors of the present disclosure have found that the combination of the clay hydration suppressant and formic acid generate drilling fluids with improved properties such as a greater tolerance to bentonite solids, improved inhibition over a range of base fluids and improved cuttings hardness compared with other commercially available clay hydration inhibitors. This can be seen for example in FIGS. 3-5 which will be discussed later in greater detail. Furthermore, it was also noted that drilling fluids of the present disclosure may exhibit the same inhibition performance with less inhibitor as compared to formulations at higher pH values and/or different pH adjusting agents.

These improved properties of the drilling fluids are caused by the addition of the formic acid to the polyoxyalkyleneamine, as well as by the ratio between the two components. In an embodiment of the present disclosure, the ratio of polyoxyalkyleneamine to formic acid (at 88%) may range from about 1.5:1 to 4:1, or from about 2:1 to about 3:1.

One of the optional components of the drilling fluids of this disclosure is a diamine which can be added to the mixture comprising the polyoxyalkyleneamine and formic acid, when the resultant mixture inhibits shale and clays to impart and/or increase permanent stability in reservoirs. In one or more embodiments, a difunctional primary amine [$H_2N$—R—$NH_2$] such as hexamethylene diamine (HMDA) is used. Use of two clay hydration inhibitors mixed with formic acid may result in high performance water based drilling fluids with improved wellbore stability and drilling performance.

The drilling fluids of the present disclosure may include a weight material in order to increase the density of the fluid. The primary purpose for such weighting materials is to increase the density of the drilling fluid so as to prevent kick-backs and blow-outs. Thus, the weight material is added to the drilling fluid in a functionally effective amount largely dependent on the nature of the formation being drilled.

Weight materials suitable for use in the formulation of the drilling fluids of the present disclosure may be generally selected from any type of weighting materials be it in solid, particulate form, suspended in solution, dissolved in the aqueous phase as part of the preparation process or added afterward during drilling. In various embodiments, the weight material may be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The aqueous based continuous phase of the present disclosure may generally be any water based fluid phase that is compatible with the formulation of a drilling fluid and is compatible with the shale hydration inhibition agents disclosed herein. In one or more embodiments, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. In one embodiment, the aqueous based continuous phase is from about 95 to about 30% by volume. In yet another embodiment, the aqueous continuous phase is from about 90 to about 40% by volume of the drilling fluid.

In addition to the other components previously noted, materials generically referred to as gelling materials, thinners, and fluid loss control agents, are optionally added to water base drilling fluid formulations. Of these additional materials, each can be added to the formulation in a concentration as rheologically and functionally determined by drilling conditions.

A variety of fluid loss control agents may be added to the drilling fluids of the present disclosure that are generally selected from the group of synthetic organic polymers, biopolymers, and mixtures thereof. The fluid loss control agents such as modified lignite, polymers, modified starches and modified celluloses may also be added to the water base drilling fluid system of this disclosure. In one embodiment the additives of the disclosure should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

The drilling fluid of the present disclosure may further contain an encapsulating agent generally selected from the group of synthetic organic, inorganic and bio-polymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anionic, cationic, amphoteric, or non-ionic in nature. In various embodiments, suitable field concentrations of the clay dispersion inhibitor in the wellbore fluid may range from 1 lb/bbl to 3 lb/bbl.

For example, in one embodiment, the drilling fluid of the present disclosure may further contain a copolymer of acrylamide-type comonomers and at least one cationic comonomer as an encapsulating agent. The role of the acrylamide-type comonomers and cationic comonomers may be to provide cuttings encapsulation and clay dispersion inhibition such as described in U.S. Publication No. 2011/0092396 A1 which is incorporated herein by reference in its entirety. Thus, the mixture may have small viscosity contribution and filtration reduction, but prevents dispersion of drilled shale or clay cuttings into the wellbore fluid. For example, in one or more embodiments, the anionic polymer in the drilling fluid may be copolymer of 10-20% hydroxypropyl acrylate and 80-90% acrylic acid. However, other co- or ter-polymers may be used. Specifically, it is also envisioned that the drilling fluid of the present disclosure may include other anionic polymers as the encapsulating agent, such as an anionic polymer with balanced charge species and charge density, and molecular weight in the range of 100,000 to 900,000.

Embodiments of the present disclosure may further use an anti-accretion additive to eliminate bit balling and enhance the rate of penetration (ROP), even when drilling the most reactive gumbo clays. Such an anti-accretion additive comprises of a mixture of an optimized lubricant (e.g., ester), a surfactant package and a non-aqueous carrier blend (e.g., paraffin) and is designed in such a manner to coat metal and cuttings surfaces to minimize interaction, thus reducing the potential shale/steel and shale/shale accretion. The anti-accretion additive may be added directly to the system with little effect and provides basic reduction of the coefficient of friction. In one or more embodiments, the field concentration of such an accretion inhibitor and ROP enhancer may be from 1.5% to 3% by volume of the fluid.

Further, embodiments of the present disclosure may use a shale sealing additive which provides lower fluid loss and permeability plugging to effectively seal shales and filter cakes. Such a sealing additive may comprise of a latex copolymer of a natural polymer and a synthetic monomer such as described in U.S. Publication No. 2011/0056752 A1 which is incorporated herein by reference in its entirety. In one or more embodiments, the shale sealing additive is used in a concentration from 1.5% to 3% by volume of the fluid. In one or more embodiments, the latex starch copolymers of the present disclosure may be provided for use in the drilling fluids in dry form, as dry particles.

The dry particles of latex starch copolymers that have shown utility in the water-based drilling fluids of the present disclosure may have a multimodal size distribution (having different percentages of different average particle sizes) of particles having a first peak in the range of about 0.2 microns to 0.5 microns, and a second peak in the range of about 2.5 microns to 6 microns. In such an embodiment, about 9 to 35 percent of the particles may fall within a size range of about 0.1 to 1 micron, about 60 to 91 percent of the particles may fall within a size range of about 1.0 to 50 microns, and at most 5% of the particles may have a size larger than 50 microns.

When used as sealing additives, latex based copolymers are conventionally provided as emulsions that are stabilized or dispersed by means of surfactants and particle surface charges. However, if the latex is dried, the surfactant rearranges and the latex based copolymer may no longer maintain its sizes and distribution to function as a pore sealant. The inventors of the present disclosure have found a way to minimize the charge requirements and sterically stabilize the latex. As a result, the particles may be redispersed in a fluid without or with reduced rearrangement. Due to the steric stabilization, the particles may be supplied in dry form and the size of the sealing particles may be small enough to effectively penetrate small and narrow voids and efficiently seal the shales and the filter cakes. In addition, the latex starch copolymers have the advantage of being compatible with different brines.

Other additives that could be present in the drilling fluids of the present disclosure include products such as lubricants, penetration rate enhancers, defoamers, corrosion inhibitors and loss circulation products. Such compounds should be known to one of ordinary skill in the art of formulating aqueous based drilling fluids. The use of the above disclosed drilling fluids is contemplated as being within the scope of the present disclosure. Such use would be conventional to the art of drilling subterranean wells and one having skill in the art should appreciate such processes and applications.

Upon mixing, the fluids of the present embodiments may be used in drilling operations. Drilling techniques are known to persons skilled in the art and involve pumping a drilling fluid into a wellbore through an earthen formation. The fluids of the present embodiments have particular application for use as high performance water based drilling fluids that can exhibit wellbore stability and drilling performance similar to oil based fluids.

One embodiment of the present disclosure involves a method of drilling a wellbore. In one such illustrative embodiment, the method involves pumping a water-based drilling fluid into a wellbore through an earthen formation. Such a drilling fluid includes an aqueous based continuous phase, a weight material and a pH adjusting additive, wherein the pH adjusting additive is formic acid and a clay hydration suppressant agent, having the formula (1) above. In an embodiment, x should have a value less than 15. In yet another embodiment, x has an average number between about 1 and about 5.

The superior performance of the water based drilling fluid formulations of this disclosure in controlling the shale hydration inhibition were determined by conducting the tests as described below. The tests were conducted in accordance with the procedures in API Bulletin RP 13B-2, 1990.

Rheology Test

Viscosity is a measurement describing the flow properties of drilling fluids and their behavior while under influence of shear stress. Using a Fann 35 Viscometer, Fann 70 Viscometer, Grace Viscometer, the rheological parameters namely plastic viscosity (PV) and yield point (YP) are determined. One of skill in the art will appreciate that the viscosity measurements will be dependent upon the temperature of the gel composition, the type of spindle, and the number of revolutions per minute. Generally, increase in the plastic viscosity and yield point values are proportional to increase of the drilling fluid density, but the yield point increases by a smaller magnitude.

Plastic Viscosity Test

Plastic viscosity (PV) is one variable used in the calculation of viscosity characteristics of a drilling fluid, measured in centipoise (cP) units. PV is the slope of the shear stress-shear rate plot above the yield point and is derived from the 600 rpm reading minus the 300 rpm reading. A low PV indicates that the mud is capable of drilling rapidly because of the low viscosity of mud exiting at the bit. High PV is caused by a viscous base fluid and by excess colloidal solids. To lower PV, a reduction in solids content can be achieved by dilution.

Yield Point Test

Yield point (YP) is another variable used in the calculation of viscosity characteristics of drilling fluids, measured in pounds per 100 feet square (lb/100 ft$^2$). The physical meaning of the Yield Point (YP) is the resistance to initial flow. YP is used to evaluate the ability of mud to lift cuttings out of the annulus. The Bingham plastic fluid plots as a straight line on a shear-rate (x-axis) versus shear stress (y-axis) plot, in which YP is the zero-shear-rate intercept (PV is the slope of the line). YP is calculated from 300-rpm and 600-rpm viscometer dial readings by subtracting PV from the 300-rpm dial reading and it is reported as lbf/100 ft$^2$. A higher YP implies that drilling fluid has ability to carry cuttings better than a fluid of similar density but lower YP.

pH Test

The pH test is performed using pH meter to determine the acidity of the drilling fluid.

Bentonite Dispersion Test

Bentonite dispersion test is used to evaluate the effectiveness of the clay hydration inhibitor. Bentonite powder was dispersed into the testing liquid with clay hydration inhibitor to homogeneity. The dispersion was then subject to viscosity measurements. If a clay hydration inhibitor works well, the bentonite clay is inhibited from hydration and thus the viscosity of the dispersion stays low, otherwise viscosity increases. Therefore, under the same amount of bentonite loading, the lower the viscosity, the better the clay hydration inhibitor. In other words, the fluid may tolerate more (clay) solid.

Hot/Roll Dispersion

Figure 4:
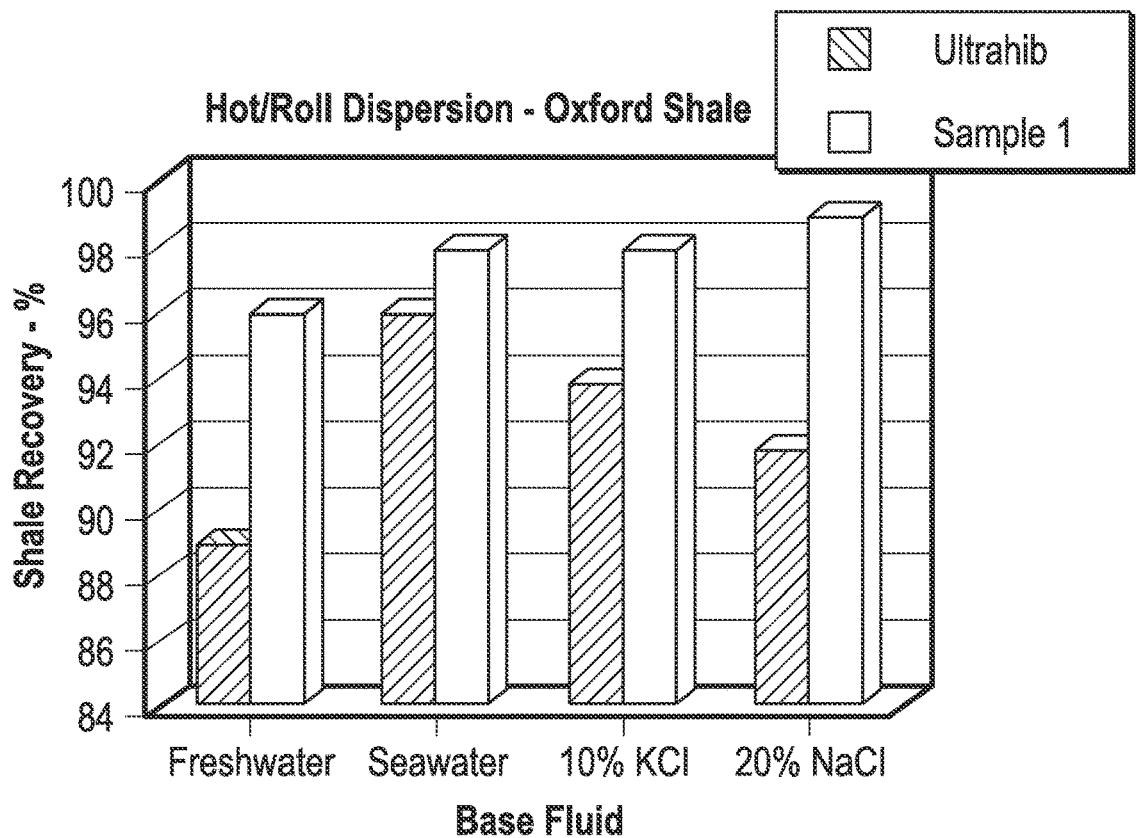
FIG. 4 is a graphical representation of the hot/roll dispersion comparison of the control and the sample formulation in different aqueous phases.

A hot-rolling dispersion test was conducted using samples of Oxford shale drilling cutting recovered from a well in the field. To 350 ml freshwater including 10.5 g of shale inhibitor was added 30 g of cuttings. The resulting mixture was hot rolled for 16 hours at 150° F. After rolling, the remaining shale cuttings were screened from the base fluid using a US 20 mesh screen and washed clean of base fluid with 10% potassium chloride aqueous solution. After drying the samples as weighed, the percentage of recovered shale was calculated. The comparative data between the control and sample formulation tested in freshwater, seawater, 20% NaCl and 10% KCl brines is shown in FIG. 4. Some of the freshwater-based mixtures contained sodium sulfate.

Bulk Hardness Test

A BP Bulk Hardness Tester is a device designed to give an assessment of the hardness of shale cuttings exposed to drilling fluids which in turn can be related to the inhibiting properties of the drilling fluid being evaluated. In this test, shale cutting are hot rolled in the test drilling fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the drilling fluid used, a plateau region in torque is reached as extrusion of the cuttings begins to take place. The torque may continue to rise which tends to occur with harder cuttings samples. Therefore, the higher the torque number obtained, the more inhibitive the drilling fluid system is considered.

The following examples are presented to illustrate the preparation and properties of the drilling fluids of the present disclosure and should not be construed to limit the scope of the disclosure, unless otherwise expressly indicated in the appended claims.

The drilling fluids of this disclosure, which include formic acid and a clay hydration suppressant, exhibit wellbore stability and drilling performance, effectively controlling the viscosity and the gel strength of an aqueous drilling fluid.

EXAMPLES

To demonstrate the role of the formic acid as a pH adjusting additive in accordance with the teachings of the present disclosure, different formulations were prepared. Specifically, mixtures of a shale inhibitor such as for example, Sample 1, having different counter ions and organic acids (such as formic acid, acetic acid and benzoic acid) or inorganic acids (such as hydrochloric acid, HCl) were evaluated at room temperature.

FIG. 1 shows the impact of the pH on the viscosity dial reading for samples having the same loading of bentonite, such as 70 bbp bentonite. The results are summarized in Table 1. As seen in Table 1, the lowest pH sample giving the lowest viscosity bentonite dispersion fluid (which means better clay hydration inhibition at higher pH samples, such as equal or higher than 9), results in higher viscosity dispersion, which means hydration inhibition is less effective. However, in order to mitigate risks such as corrosion during a drilling operation the drilling fluid is delivered in a basic environment. For example, a pH value ranging from 8 to 9 may be selected for the clay hydration inhibitor.

TABLE 1 pH impact on samples containing 70 ppb bentonite.

| pH | Dial reading viscosity at 100 rpm |
|----|-----------------------------------|
| 7  | 6                                 |
| 8  | 13                                |
| 9  | 110                               |
| 10 | 204                               |

Figure 6:
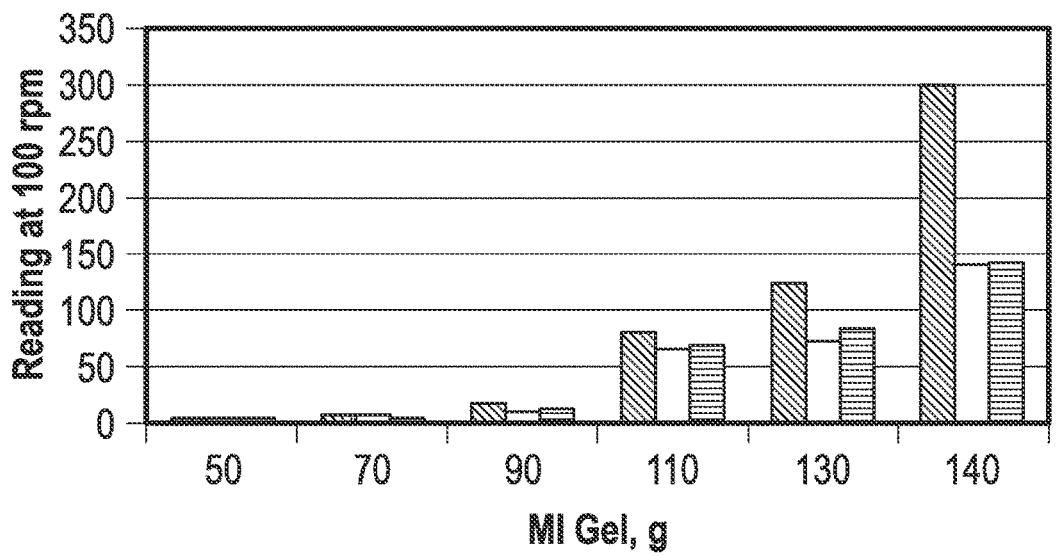
FIG. 6 is a graphical representation of the comparison of counter-ion impact.

FIG. 6 shows a comparison of the counter-ion impact on the clay hydration inhibition. Specifically, polyoxyalkyleneamine was neutralized with different acids to study the counter ion impact to the clay hydration inhibition. As can be seen from FIG. 6, acetic acid and formic acid have similar impact on the bentonite dispersion, both exhibiting better results compared to the case when the clay hydration inhibitor is neutralized with HCl.

A sample formulation of the present disclosure, named Sample 1, which includes the JEFFAMINE®D230 (a polyoxyalkyleneamine available from Huntsman) combined with formic acid was prepared, where 50% JEFFAMINE® D230 was combined with 17-19% acid, and 33-31% water was added to final formulation. Referring now to FIG. 2, the Sample 1 product package viscosity was evaluated at room temperature. As seen in FIG. 2, the mixture having HCl provides a desired performance at a pH of 8.4, with a dial reading viscosity at 100 rpm of 13. However, due to environmental regulations, formic acid may be used instead of HCl when similar performance is obtained. For example, as seen in FIG. 2, the dial reading viscosity of the mixture having formic acid at pH of 8.4 is 19. Referring still to FIG. 2, the formulation having the shale inhibitor neutralized by acetic acid has a dial reading viscosity of 63. Thus, the use of the acetic acid as a pH adjusting additive that neutralizes the polyoxyalkyleneamine used as a shale inhibitor may result in very viscous mixtures. In addition, as seen in FIG. 2, the use of benzoic acid will create a high viscosity package that is not pourable. As a result, the level of neutralization may be reduced to pH=9 in order to create a pourable package. Table 2 summarizes the experimental data shown in FIG. 2, further supporting the conclusion that formic acid used as a pH adjusting additive of the polyoxyalkyleneamine provides a field suitable package.

TABLE 2

Dial reading viscosity at room temperature.

| pH adjusting additive | Shale inhibitor | pH | Dial reading viscosity at 100 rpm |
|------------------------|-----------------|-----|-----------------------------------|
| HCl          | Sample 1 | 8.4 | 13  |
| Formic acid  | Sample 1 | 8.4 | 19  |
| Acetic acid  | Sample 1 | 8.4 | 63  |
| Benzoic acid | Sample 1 | 8.4 | 300 |
| Benzoic acid | Sample 1 | 9   | 110 |

The drilling fluid formulation used as control for comparison with other formulations is based on JEFFAMINE®D230. Formulated JEFFAMINE® D230 is a difunctional amine that functions as a shale inhibitor.

To fully assess the performance properties of the two formulations, the rheology of the resulting drilling fluids was measured using a Fann 35 Viscometer at the rpm indicated. Each of the drilling fluids was hot rolled overnight at 150° F.

Figure 3:
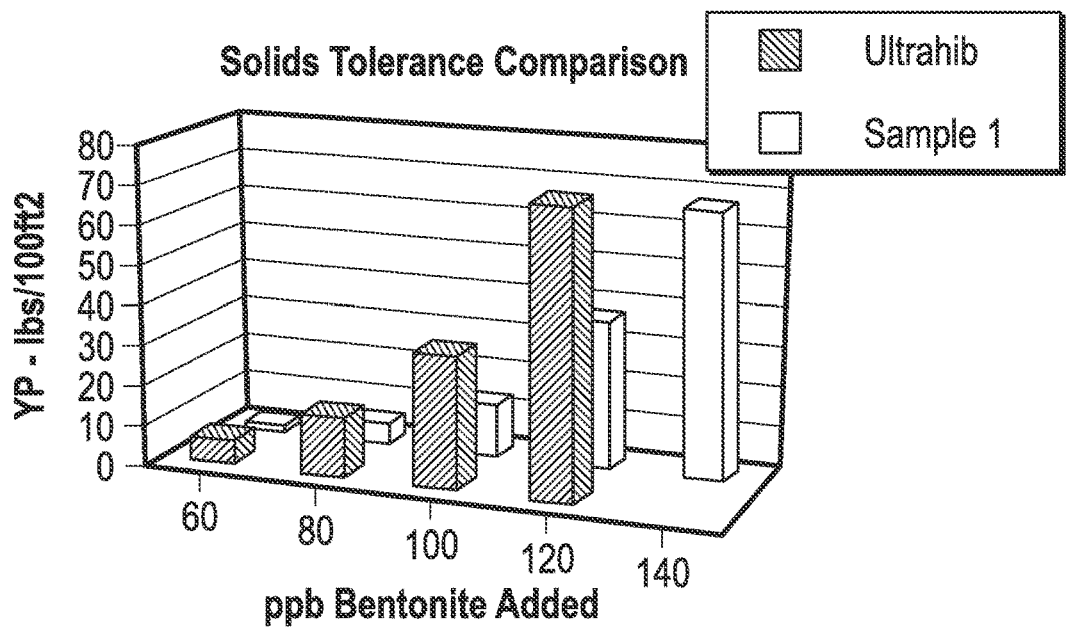
FIG. 3 is a graphical representation of the solids tolerance comparison of the control and the sample formulation.

As seen in FIG. 3, solids tolerance comparison of the sample formulation and the control shows improved solids tolerance for the drilling fluid formulated according to the present disclosure at a high concentration of bentonite added compared to ULTRAHIB™.

To further demonstrate the performance of the drilling fluids formulated in accordance with the teachings of the present disclosure, a hot/roll dispersion test was performed using various aqueous based phases, such as freshwater, seawater, and brines of 10% KCl or 20% NaCl. FIG. 4 indicates that the drilling fluid formulated according to the present disclosure has superior hot/roll dispersion compared to ULTRAHIB™.

Figure 5:
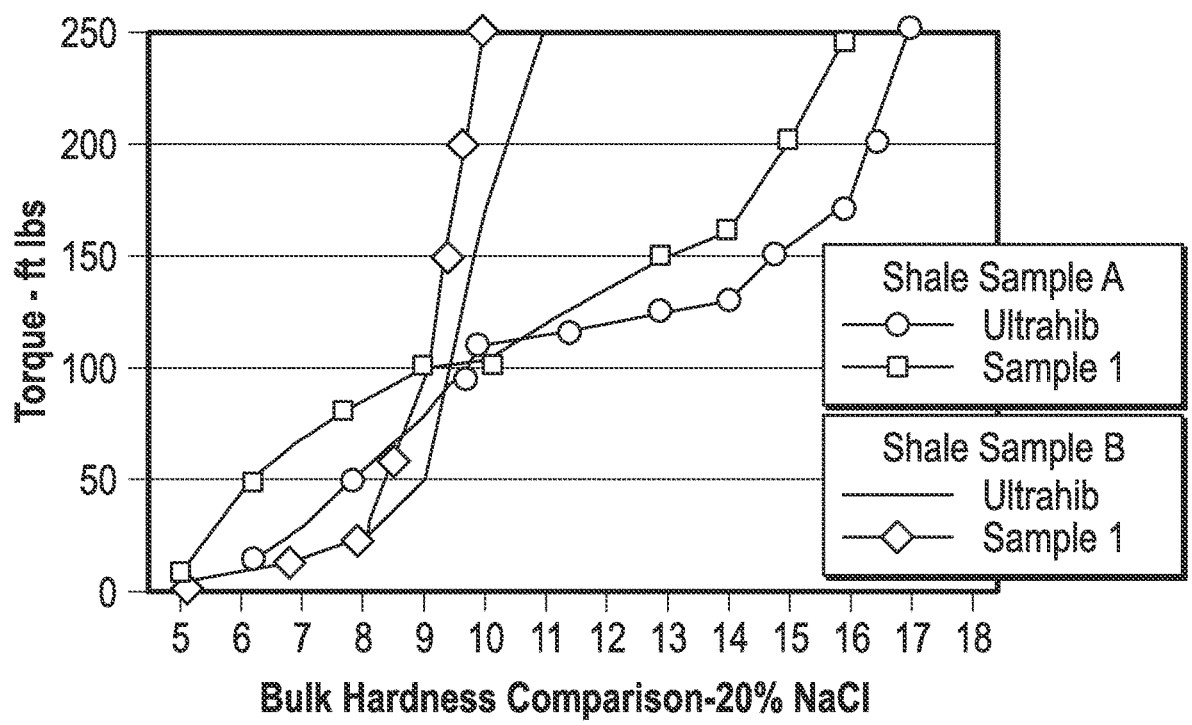
FIG. 5 is a graphical representation of the bulk hardness comparison of the control and the sample formulation in 20% NaCl brine.

Bulk hardness comparison was performed in a brine containing 20% NaCl on the control sample and the drilling fluid formulated according to the present disclosure (e.g., sample 1). Illustrative data obtained using two different shale samples A and B tested in 20% NaCl brines are shown in FIG. 5. As seen in FIG. 5, the drilling fluid formulated according to the present disclosure provides an improved cutting hardness compared to ULTRAHIB™. Therefore, the drilling fluid formulation containing the combination of formic acid and the polyoxyalkyleneamine used as a clay hydration suppressant, exhibits superior properties over ULTRAHIB™, namely a greater tolerance to bentonite solids, improved inhibition over a range of base fluids and improved cuttings hardness.

Figure 7:
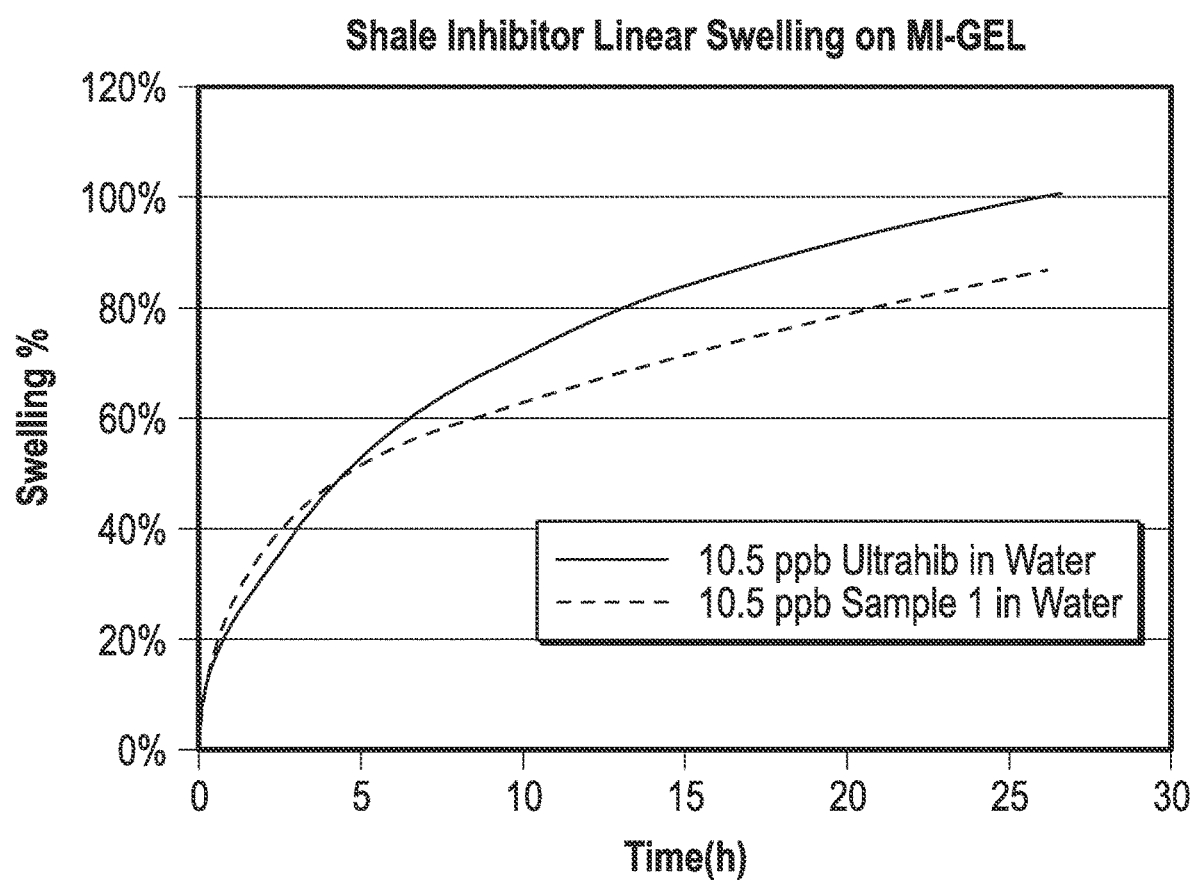
FIG. 7 is a graphical representation of the bentonite swelling comparison of a control and a sample 1 formulation.

To further demonstrate the anti-swelling properties of the shale inhibitor in accordance with the teachings of the present disclosure, ULTRAHIB™ in water and Sample 1 in water were evaluated in terms of swelling. As seen in FIG. 7, the shale inhibitor exhibits less swelling than the ULTRAHIB™.

Advantageously, embodiments of the present disclosure provide drilling fluids with improved wellbore stability and drilling performance, and methods of drilling with such fluids, that include a polyoxyalkyleneamine clay hydration suppressant and formic acid as a pH adjusting additive. The inventors of the present disclosure have found that the presence of dry particles of a pore sealant having steric stabilization and a multimodal distribution provides for efficient sealing the shales and the filter cakes.

The drilling fluid may optionally include a diamine with a low molecular weight such as hexamethylene diamine as a second clay hydration suppressant, which improves solids tolerance and lowers the clay hydration levels. Thus, the drilling fluids of the present disclosure may advantageously exhibit improved wellbore stability and drilling performance similar to oil based fluids.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A fluid, comprising:
an aqueous based continuous phase;
a pH adjusting additive consisting of formic acid;
a first clay hydration suppressant agent having the formula:

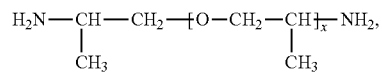

wherein x is a value less than 15;
a second clay hydration suppressant agent comprising a diamine;
a sealing additive comprising a plurality of dry particles of a latex-starch copolymer, wherein
the dry particles of the latex-starch copolymer have steric stabilization and a multimodal size distribution and
the sealing additive is present at a concentration ranging from 1.5% to 3% by volume of the fluid; and
an anionic polymer encapsulating agent having balanced charge species and charge density and comprising a copolymer of hydroxypropyl acrylate and acrylic acid having a molecular weight in a range of 100,000 to 900,000.

2. The fluid of claim 1, wherein x has an average number between about 1 and about 5.

3. The fluid of claim 1, wherein the first clay hydration suppressant agent is present in the fluid at a concentration from about 2 volume percent to about 4 volume percent.

4. The fluid of claim 1, wherein the formic acid is used in such an amount to acidify the fluid to a pH of less than 8.5.

5. The fluid of claim 4, wherein the pH of the fluid is from about 8 to about 8.5.

6. The fluid of claim 1, wherein a ratio of the first clay hydration suppressant agent to the formic acid is from about 2:1 to about 3:1.

7. The fluid of claim 1, further comprising at least one weight material selected from the group consisting of barite, hematite, iron oxide, calcium carbonate, magnesium carbonate, organic and inorganic salts, and combinations thereof.

8. The fluid of claim 1, wherein the diamine is hexamethylenediamine.

9. The fluid of claim 1, wherein the aqueous based continuous phase is selected from the group consisting of fresh water, sea water, brine, mixtures of water and water soluble organic compounds, and mixtures thereof.

10. The fluid of claim 1, wherein the multimodal size distribution of the dry particles has a first peak in the range of about 0.2 microns to 0.5 microns and a second peak in the range of about 2.5 microns to 6 microns, wherein about 9 to 35 percent of the dry particles fall within a size range of about 0.1 to 1 micron.

11. The fluid of claim 10, wherein about 60 to 91 percent of the dry particles fall within a size range of about 1.0 to 50 microns.

12. The fluid of claim 11, wherein at most 5% of the dry particles have a size larger than 50 microns.

13. The fluid of claim 1, wherein the multimodal size distribution of the dry particles has a first peak in the range of about 0.2 microns to 0.5 microns and a second peak in the range of about 2.5 microns to 6 microns, wherein about 9 to 35 percent of the dry particles fall within a size range of about 0.1 to 1 micron.

14. A fluid, comprising:
an aqueous based continuous phase;
a pH adjusting additive consisting of formic acid;
a clay hydration suppressant agent having the formula:

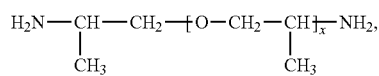

wherein x is a value less than 15; and
an encapsulating agent comprising an anionic polymer with balanced charge species and charge density and a molecular weight in a range of 100,000 to 900,000, wherein the anionic polymer is a copolymer of 10-20% hydroxypropyl acrylate and 80-90% acrylic acid.

15. The fluid of claim 1, further comprising an anti-accretion additive mixture comprising at least one of:
a lubricant;
a surfactant; and
a non-aqueous carrier blend.

16. The fluid of claim 15, wherein at least the lubricant and the non-aqueous carrier blend are present in the anti-accretion additive mixture, the lubricant comprises an ester, and the non-aqueous carrier blend comprise a paraffin.

17. The fluid of claim 1, further comprising an anti-accretion additive mixture comprising:
a lubricant comprising an ester;
a surfactant; and
an optional non-aqueous carrier blend,
wherein the anti-accretion additive mixture is present in the fluid at a concentration from 1.5% to 3% by volume of the fluid.

* * * * *